United States Patent [19]
Bartlett

[11] Patent Number: 5,592,871
[45] Date of Patent: Jan. 14, 1997

[54] PORTABLE STOVE TOP GRILL

[76] Inventor: Albin C. Bartlett, 1496 Shirona La., Oak Harbor, Wash. 98277

[21] Appl. No.: 403,218

[22] Filed: Mar. 13, 1995

[51] Int. Cl.[6] .................... A21B 1/52; A48J 37/07
[52] U.S. Cl. ................. 99/400; 99/401; 99/444; 99/449; 126/273.5; 126/275 R
[58] Field of Search ............ 99/400, 401, 385, 99/425, 444, 447, 449; 126/9 R, 27, 12, 14, 9 A, 9 B, 275 R, 273.5

[56] References Cited

U.S. PATENT DOCUMENTS

| | | | |
|---|---|---|---|
| 1,194,137 | 8/1916 | Brown | 126/9 R |
| 3,469,524 | 9/1969 | Trozzolo | 99/425 |
| 3,498,210 | 3/1970 | O'Toole | 99/357 |
| 3,641,922 | 2/1972 | Nachanel et al. | 99/340 |
| 3,745,912 | 7/1973 | Field | 99/447 |
| 3,837,328 | 9/1974 | Schaffer | 126/29 |
| 4,454,805 | 6/1984 | Matthews | 99/400 |
| 4,508,024 | 4/1985 | Perkins | 926/27 |
| 4,532,912 | 8/1985 | Burnside, III | 126/30 |
| 4,729,297 | 3/1988 | Iranzadi | 99/401 |
| 4,800,865 | 1/1989 | Setzer | 99/407 |
| 4,976,252 | 12/1990 | Cianciola | 126/27 |
| 5,284,126 | 2/1994 | Varney | 126/50 |
| 5,365,833 | 11/1994 | Chen | 99/401 |

*Primary Examiner*—Timothy F. Simone
*Assistant Examiner*—Reginald L. Alexander

[57] ABSTRACT

A stove top grill assembly for barbecuing foods comprising a base portion (12) with supporting means (20, 16) for a cooking grill (10) and a stone (14) enclosing a central cavity (18). When in use the stone (14) rests directly over a burner or concentrated heat source surface separating foods being cooked on the grill (10) above from flames below and allowing rapid heat distribution without flame penetration. Conversely the stone (14) captures food and grease drippings from above converting them to flavor inducing smoke for barbecuing without igniting.

14 Claims, 2 Drawing Sheets

PORTABLE STOVE TOP GRILL

BACKGROUND OF THE INVENTION

1. Field of the Invention

This invention relates to cooking grills that are portable in nature and that can be positioned on the surface of camp or backpack stoves or other concentrated heat sources.

2. Background Art

Devices used for stove top cooking in what is regarded as primitive circumstances have primarily relied upon designs which position a food engagement grill or mesh surface over a burner of a stove top or heat source to grill food thereon: Cianciola, U.S. Pat. No. 4,976,252, Dec. 11, 1990; Iranzadi, U.S. Pat. No. 4,729,297, Apr. 8, 1988; Trozzolo, U.S. Pat. No. 3,469,524, Sep. 30, 1969. These devises use either an annular shaped base device filled with water for stability and to reduce flare-ups caused from splattering fats or have a designed central opening in the base, grease catch plate, and grill to keep the potentially flammable fats from possible ignition or contact with the heat source. In so doing they have either limited their cooking surface to an area around the central opening or reduced the smoke and odors which helps create the actual barbecue flavor. Furthermore in an effort to reduce the amount of smoke and odors, a reservoir of water is added wherein the extracted grease drips, changing the flavor and texture of the food by partial steaming. This nearly boiling water also posses a safety concern when used in less than modern conditions. Devises that don't require water or restrict the cooking juices from making contact with the heat source thereby creating smoke and odors which flavor the food can be found in Bunside, III, U.S. Pat. No. 4,532,912, Aug. 6, 1985; Schaffer and assignee Marlo, U.S. Pat. No. 3,837,328, Sep. 24, 1974; Nacharel et al, U.S. Pat. No. 3,641,922, Feb. 15, 1972 and O'Toole, U.S. Pat. No. 3,498,210, Mar. 3, 1970. These designs are for specific use with open heat sources such as wood and charcoal, but are not effective when used with other concentrated heat sources such as stove top camp and backpack stoves. The present invention embodies improvements which overcome problems noted in such basic stove top cookers and grills.

SUMMARY OF THE INVENTION

Accordingly, several objects and advantages of my stove top grill are:

(a) to provide a cooking surface directly over the heat source without channeling the grease;

(b) to provide a method allowing the juices from foods being grilled to create smoke and odor without igniting;

(c) to provide a grill that can be easily stored;

(d) to provide a dry grilling method whereby other elements such as water are not needed;

(e) to provide a compact, lightweight and easily transportable grill;

(f) to provide a grill that can be easily cleaned;

(g) to provide a grill that can be made different in both size and shape;

(h) to provide a grill that is substantially unaffected by repeated exposure to high heat;

(i) to provide a grill that is dishwasher safe;

(j) to provide a grill that is adapted for use with multiple heat sources;

(k) to provide a grill that can be used in either primitive or modern conditions.

Further objects and advantages are that it can be constructed in a form that is easy to disassemble and reassemble for component replacement or cleaning. It is simple to use and manufacture, and it can be converted for other cooking tasks such as baking by placing a pot with a lid over the top of the grill. The stone and the grill provide even heat distribution and separation allowing for warming and baking without burning. Still other objects and advantages of my invention will become apparent from consideration of the drawings and ensuing description.

REFERENCE NUMERALS IN DRAWINGS

| | | | |
|---|---|---|---|
| 10 | grill | 12 | base |
| 14 | stone | 16,16' | stone supporting means |
| 18 | central cavity | 20 | grill supporting means |
| 22,22' | taper-lock guides | 24 | connecting seam |
| 26 | taper-lock keeper | | |

DETAILED DESCRIPTION OF THE INVENTION

Figure 1:
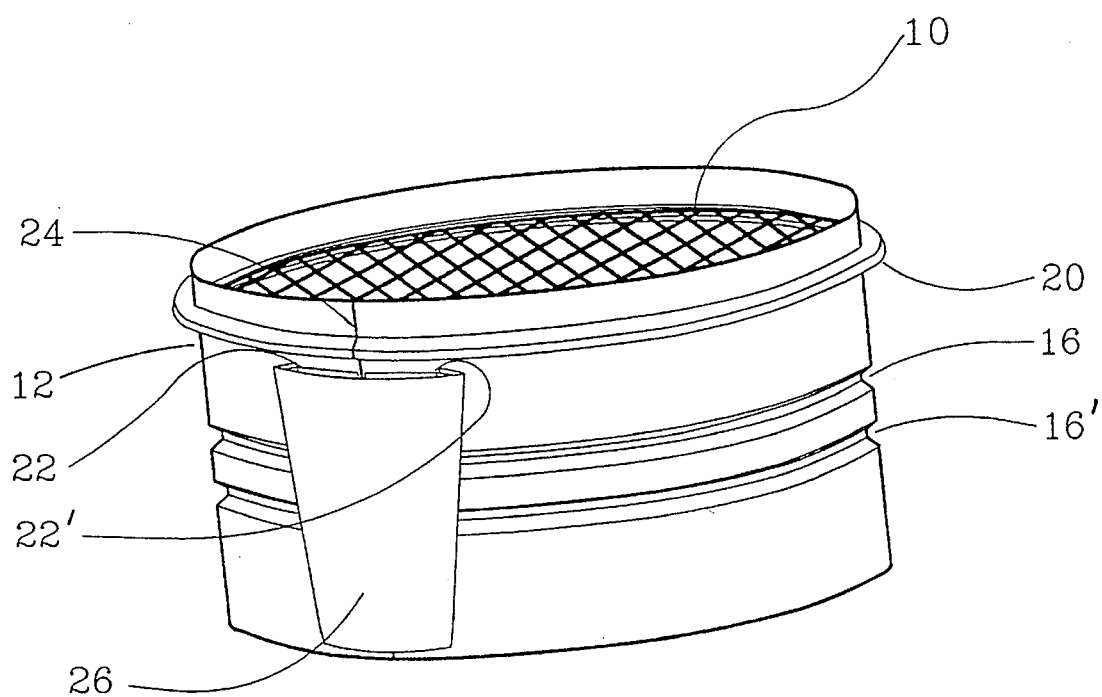
FIG. 1 is a perspective of a portable stove top grill device disclosed herein.
Figure 2:
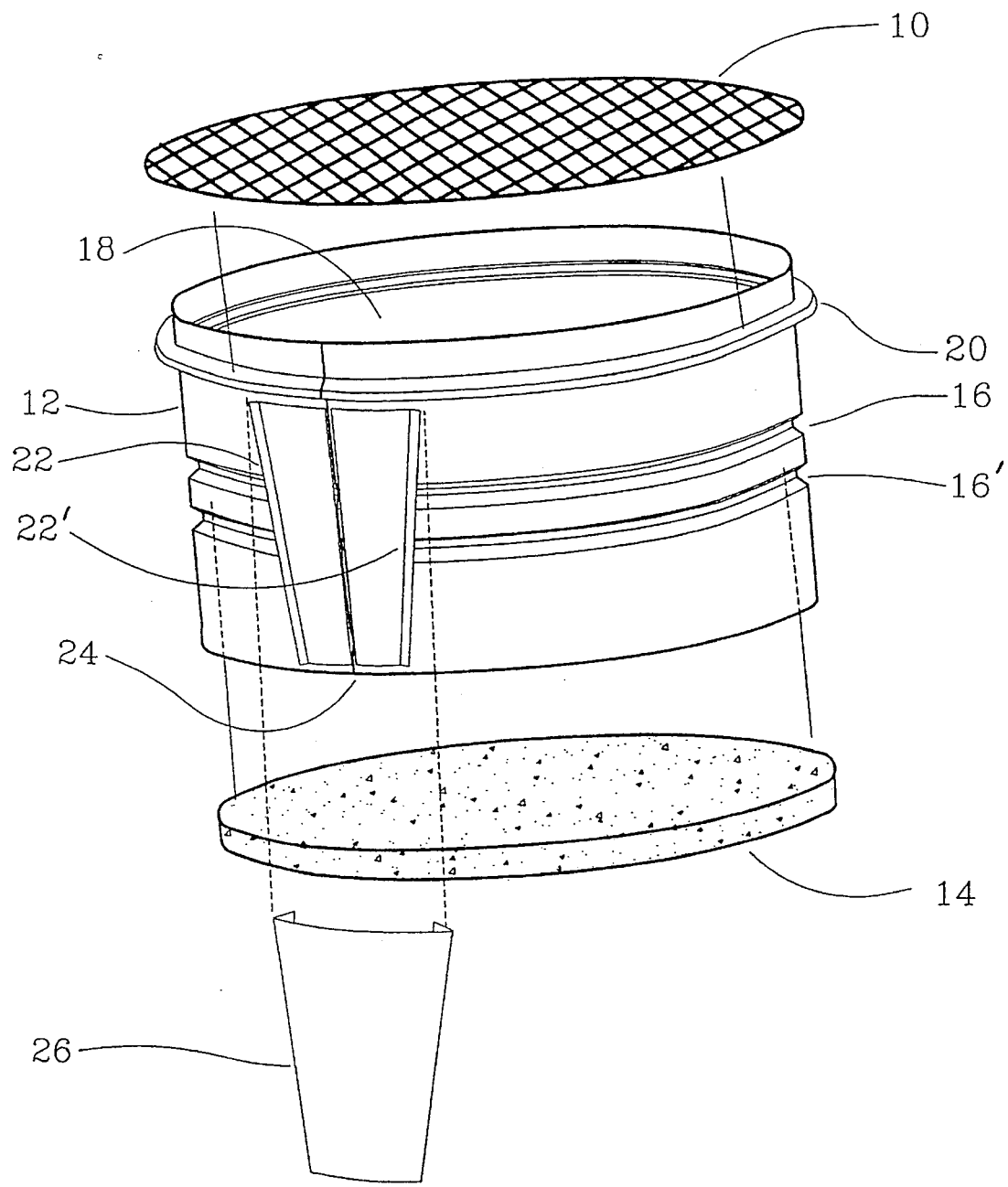
FIG. 2 is an exploded assembly view of one embodiment of the portable stove top grill illustrating all components.

A typical embodiment of the stove top grill apparatus is illustrated in FIG. 1 (perspective). Referring now to FIG. 2 (exploded) view, the stove top smoker grill assembly can be seen comprising a base portion 12, which surrounds an open ended central cavity 18, and supporting a grill portion 10, and a stone portion 14. Taper-lock guides portion 22, are attached to each side of the connecting seam portion 24, and a sliding taper-lock keeper portion 26, locks the grill and stone firmly into the central cavity portion 18, of the base portion 12.

The illustrated base portion 12, is a cincture wall encasing the stone 14, and grill 10, within the central cavity 18. The base portion can be made from metallic materials such as stainless steel. In order to secure the stone 14 and grill 10 within the central cavity 18, a connecting seam 24, in the central base 12 that can be easily locked or fastened together is desired. One of many possible methods of securing or locking the connecting seam 24 is shown by using two taper-lock guides 22, permanently fastened to the base 12, and a taper-lock keeper 26. Other securing or locking methods such as a clasp, hasp, screws, band, scarf, rivet, hook, pin, weld, coupling, clamp and the like can also be used.

The cooking surface is the grill portion 10, which can be made from a metallic material preferably stainless steel and is positioned within the central cavity 18, substantially perpendicular to the central axis thereof near the rim of the base 12, and supported by the grill supporting means 20.

The stone 14, is secured within the central cavity 18, substantially perpendicular to the central axis thereof by the stone support means 16, within the base 12. The seam 24 is closed by sliding the taper-lock keeper 26 onto the taper-lock guides 22 located on each side of the connecting seam 24 of the base 12.

It will be apparent that when the grill device is placed directly over the heat source or burner (not shown) utilizing conventional pan stabilizing devices (not shown) it provides a stable cooking grill 10 surface which will allow natural juices and grease to fall from the cooking food stuffs onto the porous stone 14 adding flavor and smoke without igniting. Furthermore, it is lightweight, compact, easy to use and clean, and is adaptable for use with many different types of concentrated heat sources.

The stove top grill apparatus of the present invention comprises a base portion comprising at least one side wall, which surrounds an open-ended central cavity, a grill portion for holding food, and a stone portion. The base portion further comprises supporting means for the grill portion and the stone portion. The stone portion is thereby positioned within the central cavity substantially perpendicular to the central axis thereof. The grill portion is preferably placed near one end of the base portion, preferably within the central cavity, although it may be supported above the base portion, such as by tabs or clips that extend beyond the wall of the base portion. The grill apparatus can also be designed so that the grill portion can be retained at either end. Other means for supporting the grill portion include one or more latitudinal grooves, rivets, welds and the like. The stone is positioned in spaced relation to the grill so that in use it is disposed between the heat source and the grill. In this arrangement, the stone can provide a heat sink that radiates heat substantially evenly to the grill portion, allows high temperature heat to penetrate through the stone for cooking, and can become sufficiently hot to cook off and smoke the drippings from foods without allowing the drippings to reach the heat source, thereby eliminating flare-ups and charring of foodstuffs. The stone portion can be any of a number of natural or man-made substances that are effectively inert and non-combustible under conditions of normal use, such as natural stone and man-made, stone-like materials. Examples of the former include lava rock and other stones that are sufficiently porous to allow some penetration of food drippings. Examples of man-made materials include bonded matrices of substantially inert, noncombustible particles, such as silicon-carbide particles, which can be bonded with procelain according to methods commonly employed in the manufacture of abrasive wheels.

The base portion can be a made in a variety of forms and shapes. It is preferred to include a connecting seam, an example of which is shown in the drawings as 24. Inclusion of a seam allows the base portion to be opened for easy removal of the stone portion and grill portion, thereby facilitating cleaning or replacement of these components and allowing the stone portion to be inverted to cook off food byproducts. The seam can be secured by a variety of fastening means to provide a substantially rigid, single unit.

Furthermore, the stove top smoker grill has additional advantages in that it can be made in different sizes and shapes such as square, rectangular, octangular, round, oval and the like;

the stone can be made in different porosities, thicknesses and densities;

the stone can be made in different sizes and shapes such as square, rectangular, octangular, round, oval and the like;

the stone can be made as a single piece or in multiple pieces;

the stone can comprise a silicon carbide material bonded with porcelain or can be made from other elements such as aluminum oxide and the like;

the stone is inert and can be broken-up into sand like material for disposal;

the base can be made with different custom enclosure materials;

it can be washed in a dishwasher;

it is lightweight and durable;

it is simple to use;

it is easy to manufacture;

it is inexpensive to produce;

it is substantially unaffected from constant use under high heat;

it is adapted for use with multiple heat sources;

it requires no liquids for stability or to capture grease;

it provides a full evenly heated cooking surface.

Although the description above contains several specificities, these should not be construed as limitations on the scope of the invention, but rather as an exemplification of certain preferred embodiments thereof. Many other variations are possible. For example the taper-lock mechanism could also serve as an attachment for a handle, or the connecting seam could be a sliding joint much like that of a spring-form pan, or the base portion and/or the grill portion could be made from a cold-to-touch ceramic material, or the porous stone could be made from several different types of inert bonded elements.

Thus the scope of the invention should be determined by the appended claims and their legal equivalents, rather then by the examples given.

I claim:

1. A stove top grill apparatus for barbecue cooking food on concentrated heat sources comprising: a base portion comprising at least one side wall, grill supporting means, and stone supporting means, said base portion surrounding an open ended central cavity; a grill portion for holding food supported by said base portion; and a stone portion supported by said base portion within said cavity substantially parallel to and in spaced relation to said grill portion; wherein said grill portion does not channel drippings from food cooked thereon out of said apparatus but is configured to allow said drippings to fall onto said stone portion; wherein said base portion comprises a connecting seam and means to close said connecting seam.

2. The stove top grill apparatus of claim 1 wherein said grill supporting means comprises at least one of the following: a latitudinal groove, tabs, clips, rivets or welds.

3. The stove top grill apparatus of claim 1 wherein said grill portion is composed of shaped metallic material.

4. The stove top grill apparatus of claim 1 wherein said base portion is composed of a metallic material.

5. The stove top grill apparatus of claim 1 wherein said stone comprises a bonded matrix of substantially inert, non-combustible particles.

6. The stove top grill apparatus of claim 5 wherein said stone comprises a silicon-carbide material bonded with porcelain.

7. The stove top grill apparatus of claim 1 wherein said stone serves as a heat distributor radiating heat substantially evenly to said grill portion.

8. The stove top grill apparatus of claim 1 wherein said stone is removably retained by said base portion.

9. The stove top grill apparatus of claim 8 wherein said stone can be turned over to cook off food byproducts.

10. The stove top grill apparatus of claim 1 wherein said grill is positioned within said central cavity and retained therein by a latitudinal containment groove in said base portion.

11. The stove top grill apparatus of claim 1 wherein said base portion further comprises a connecting seam.

12. The stove top grill apparatus of claim 11 further comprising a sliding taper-lock keeper and wherein said base portion comprises two taper-lock guides, wherein engagement of said sliding taper-lock keeper with said two taper-lock guides closes said connecting seem to retain said grill portion and said stone portion within said cavity.

13. The stove top grill apparatus of claim 12 wherein said guides and said keeper forms a mounting means adapted to receive a handle.

14. stove top grill apparatus of claim 1 whereas said stone portion consists of a single piece.

\* \* \* \* \*